United States Patent
Green, Sr. et al.

(10) Patent No.: US 7,542,717 B2
(45) Date of Patent: *Jun. 2, 2009

(54) SATELLITE BROADCAST RECEIVING AND DISTRIBUTION SYSTEM

(75) Inventors: James A. Green, Sr., Tallahassee, FL (US); Austin S. Coker, Jr., Tallahassee, FL (US)

(73) Assignee: Global Communications, Inc., Tallahassee, FL (US)

( * ) Notice: Subject to any disclaimer, the term of this patent is extended or adjusted under 35 U.S.C. 154(b) by 425 days.

This patent is subject to a terminal disclaimer.

(21) Appl. No.: 11/089,131

(22) Filed: Mar. 24, 2005

(65) Prior Publication Data

US 2005/0221756 A1 Oct. 6, 2005

Related U.S. Application Data

(63) Continuation of application No. 10/016,119, filed on Dec. 17, 2001, now Pat. No. 6,917,783, and a continuation of application No. 09/621,464, filed on Jul. 21, 2000, now Pat. No. 6,334,045, and a continuation of application No. 09/001,484, filed on Dec. 31, 1997, now Pat. No. 6,122,482, and a continuation of application No. 08/838,677, filed on Apr. 9, 1997, now Pat. No. 5,805,975, and a continuation of application No. 08/394,234, filed on Feb. 22, 1995, now abandoned.

(51) Int. Cl.
*H04H 20/74* (2008.01)
*H04B 7/185* (2006.01)

(52) U.S. Cl. .................. 455/3.02; 455/12.1; 725/63; 348/E7.05; 348/E7.093

(58) Field of Classification Search ............ 455/3.01, 455/3.02, 3.03, 3.04, 12.1, 14, 20, 22, 179.1, 455/427, 428; 348/E7.05, E7.093, E7.04; 725/63, 67, 68

See application file for complete search history.

(56) References Cited

U.S. PATENT DOCUMENTS 3,324,417 A 6/1967 Garner (Continued)

FOREIGN PATENT DOCUMENTS

CN 67200 12/1992

(Continued)

OTHER PUBLICATIONS

"Broadband Communication Agile Processor 362HL," cadco Inc., 1990 Catalog, 6 pages.

(Continued)

*Primary Examiner*—Quochien B Vuong
(74) *Attorney, Agent, or Firm*—Nixon & Vanderhye PC (57) ABSTRACT

A satellite signal distribution system distributes signal blocks of two different received frequencies and polarities simultaneously over the same cable. The satellite system includes a satellite dish or antenna that receives signals. These received signals are transmitted to a block frequency converter that enables the different frequency polarity blocks to be distributed simultaneously via a single cable. The cable is coupled to a head-out receiver processor which distributes the signals to satellite receivers. The receivers are connected to TVs or other sources. This unique design and configuration provides for a system that will permit satellite broadcast signal distribution to high-rise buildings, hospitals, condominiums, schools, and the like.

32 Claims, 1 Drawing Sheet

U.S. PATENT DOCUMENTS

| | | |
|---|---|---|
| 3,665,316 A | 5/1972 | Jeffers |
| 3,730,980 A | 5/1973 | Kirk, Jr. |
| 3,936,594 A | 2/1976 | Schubin et al. |
| 4,023,104 A | 5/1977 | Rheinfelder |
| 4,066,966 A | 1/1978 | Takeuchi et al. |
| 4,130,801 A | 12/1978 | Prygoff |
| 4,135,202 A | 1/1979 | Culter |
| 4,183,054 A | 1/1980 | Patisaul et al. |
| 4,395,734 A | 7/1983 | Rypkema |
| 4,419,768 A | 12/1983 | Yamashita et al. |
| 4,429,418 A | 1/1984 | Hooper |
| 4,439,740 A | 3/1984 | Harrington |
| 4,484,218 A | 11/1984 | Boland et al. |
| 4,486,773 A | 12/1984 | Okubo |
| 4,509,198 A | 4/1985 | Nagatomi |
| 4,512,033 A | 4/1985 | Schrock |
| 4,513,315 A | 4/1985 | Dekker et al. |
| 4,527,136 A | 7/1985 | Kamiya |
| 4,530,008 A | 7/1985 | McVoy |
| 4,532,543 A | 7/1985 | Groenewegen |
| 4,538,174 A | 8/1985 | Gargini et al. |
| 4,538,175 A | 8/1985 | Balbes et al. |
| 4,542,300 A | 9/1985 | Nagatomi |
| 4,545,048 A | 10/1985 | Hauk et al. |
| 4,545,075 A | 10/1985 | Miller et al. |
| 4,556,988 A | 12/1985 | Yoshisato |
| 4,558,358 A | 12/1985 | Onda |
| 4,580,161 A | 4/1986 | Petrus et al. |
| 4,586,081 A | 4/1986 | St. Arnuad et al. |
| 4,592,093 A | 5/1986 | Ouchi et al. |
| 4,605,968 A | 8/1986 | Hayashi |
| 4,608,710 A | 8/1986 | Sugiura |
| 4,616,108 A | 10/1986 | Yamaguchi et al. |
| 4,648,123 A | 3/1987 | Schrock |
| 4,667,243 A | 5/1987 | Blatter et al. |
| 4,677,686 A | 6/1987 | Hustig et al. |
| 4,709,418 A | 11/1987 | Fox et al. |
| 4,710,777 A | 12/1987 | Halverson |
| 4,710,972 A | 12/1987 | Hayashi et al. |
| 4,739,510 A | 4/1988 | Jeffers et al. |
| 4,761,825 A | 8/1988 | Ma |
| 4,761,827 A | 8/1988 | Horton et al. |
| 4,866,787 A | 9/1989 | Olesen |
| 4,901,367 A | 2/1990 | Nicholson |
| 4,959,862 A | 9/1990 | Davidov et al. |
| 4,979,230 A | 12/1990 | Marz |
| 4,993,066 A | 2/1991 | Jenkins |
| 5,045,823 A | 9/1991 | Nichols, III |
| 5,073,930 A | 12/1991 | Green et al. |
| 5,136,411 A | 8/1992 | Paik et al. |
| 5,181,106 A | 1/1993 | Sutherland |
| 5,204,767 A | 4/1993 | Nakata et al. |
| 5,206,954 A | 4/1993 | Inoue et al. |
| 5,216,432 A | 6/1993 | West |
| 5,221,983 A | 6/1993 | Wagner |
| 5,225,799 A | 7/1993 | West et al. |
| 5,276,904 A | 1/1994 | Mutzig et al. |
| 5,301,352 A | 4/1994 | Nakagawa et al. |
| 5,303,229 A | 4/1994 | Withers et al. |
| 5,303,403 A | 4/1994 | Leong |
| 5,331,332 A | 7/1994 | West et al. |
| 5,345,591 A | 9/1994 | Tsurumaki et al. |
| 5,437,051 A | 7/1995 | Oto |
| 5,440,319 A | 8/1995 | Raymond et al. |
| 5,455,961 A | 10/1995 | Nakagawa |
| 5,457,811 A | 10/1995 | Lemson |
| 5,463,407 A | 10/1995 | West et al. |
| 5,481,542 A | 1/1996 | Logston et al. |
| 5,488,413 A | 1/1996 | Elder et al. |
| 5,488,659 A | 1/1996 | Miliani |
| 5,504,609 A | 4/1996 | Alexander et al. |
| 5,541,757 A | 7/1996 | Fuse et al. |
| 5,572,347 A | 11/1996 | Burton et al. |
| 5,574,964 A | 11/1996 | Hamlin |
| 5,592,540 A | 1/1997 | Beveridge |
| 5,630,226 A * | 5/1997 | Kanda et al. ................. 455/313 |
| 5,644,368 A | 7/1997 | Natsume |
| 5,657,143 A | 8/1997 | Hajj et al. |
| 5,659,351 A | 8/1997 | Huber |
| 5,666,126 A | 9/1997 | Lange |
| 5,682,426 A | 10/1997 | Miliani et al. |
| 5,737,698 A | 4/1998 | Gabrelian et al. |
| 5,752,180 A | 5/1998 | Guo et al. |
| 5,787,335 A | 7/1998 | Novak |
| 5,793,258 A | 8/1998 | Lange |
| 5,805,975 A | 9/1998 | Green, Sr. et al. |
| 5,812,591 A | 9/1998 | Shumaker et al. |
| 5,812,947 A | 9/1998 | Dent |
| 5,835,128 A | 11/1998 | Macdonald et al. |
| 5,889,498 A | 3/1999 | Lange et al. |
| 5,898,455 A | 4/1999 | Barakat et al. |
| 5,933,123 A | 8/1999 | Kaul |
| D414,187 S | 9/1999 | Lange et al. |
| 5,959,592 A | 9/1999 | Petruzzelli |
| 5,970,386 A | 10/1999 | Williams |
| 5,995,258 A | 11/1999 | Weber et al. |
| 6,104,908 A | 8/2000 | Schaffner et al. |
| 6,122,482 A | 9/2000 | Green, Sr. et al. |
| 6,134,419 A | 10/2000 | Williams |
| 6,334,045 B1 | 12/2001 | Green, Sr. et al. |
| 6,397,038 B1 | 5/2002 | Green, Sr. et al. |
| 6,486,907 B1 | 11/2002 | Farber et al. |
| 6,947,702 B2 | 9/2005 | Green, Sr. et al. |
| 2003/0040270 A1 | 2/2003 | Green et al. |

FOREIGN PATENT DOCUMENTS

| | | |
|---|---|---|
| DE | 3623581 | 4/1988 |
| DE | 4117208 A1 | 11/1992 |
| DE | 41 26 774 | 1/1993 |
| DE | 41 28 947 A1 | 3/1993 |
| DE | 43 34 440 A1 | 4/1995 |
| DE | 4334440 | 4/1995 |
| EP | 0421708 A2 | 4/1991 |
| FR | 2642598 A1 | 7/1991 |
| GB | 2119192 | 11/1983 |
| GB | 2137843 A | 10/1984 |
| JP | 2-140022 | 11/1988 |
| JP | 63309032 | 12/1988 |
| JP | 2-140022 | 5/1990 |
| JP | 196279 | 11/1992 |
| JP | 5-344014 | 12/1993 |

OTHER PUBLICATIONS

"Private Cable Update" Dec. 1997.
"Announcing Heifner Communications' DBS Transport with DirecTV," Private Cable Update (Sep. 1997).
"Bridging the DBS Market," Private Cable Investor, No. 198 (Nov. 30, 1996).
"DBS Transport," "Heifner Communications, Inc. in cooperation with World Satellite Network (WSNet), announces the first availability of DBS transport to the Private Cable Market," with DBS Survey (Aug. 11, 1997 fax).
"DirecTV, Inc. Launches MDU Program," Retailer News (Sep. 2-8, 1996).
"DirecTV, Inc. Launches Program to Serve Multiple-Family Dwelling Unit Market" (Aug. 8, 1996).
"Heifner Communications completes installation of first fiber optic deliverd L-band system in the U.S.," Private Cable Update (Dec. 1997).
"Special Advertising Section, 1997 Buyer's Guide," Private Cable & Wireless Cable, p. A19, A16 (Jan. 1997).
"The report on the development of the most effective solution yet developed to distribute digital satellite signals in large properties,"

Presented jointly by; Heifner Communications, Inc., Foxcom, Ltd., Global Communications, Inc. (Mar. 1997).
"Untangling the MDU/DBS Universe," Private Cable Investor (Apr. 30, 1997).
Nov. 11, 1996 letter (with attachment).
Dec. 10, 1996 letter (with attachment).
May 24, 1996 letter (with attachments) from Williams to Coker.
Jun. 12, 1996 letter from Coker to Williams.
Advertisement, "Don't cut corners on your installation," ChannelPlus, TVRO Dealer (May 1997).
Advertisement, CommScope, Inc. Network Cable Division, TVRO Dealer (Sep. 1994).
Allon, Mor, "Delivering the Satellite Goods," and WSNet Advertisement, "It is a small world, after all.," Private Cable & Wireless Cable, vol. 16, No. 11 (Nov. 1997).
Baylin, "Digital Satellite TV" (5th Ed. 1997), pp. 92-93 and 159-163.
Baylin, Frank, et al., *World Satellite TV and Scrambling Methods*, third edition, 1993, Baylin Publications, Boulder, CO, pp. 7-14.
Brucke zum Kunden, Neue UKW-Kanalumsetzer ubertragen viele Programme in bester Stereo-Qualitat fur grosse Germeinschafts-Antennenanlagen, Eckar Germany (1973).
Cooper Jr., Robert B., "Backyard Satellite TV Receiver, Conclusion" Build This.
Cooper Jr., Robert B., "Backyard Satellite TV Receiver," Build This.
Cooper Jr., Robert B., "Home Reception Using Backyard Satellite TV Receivers," Technology Today.
Cooper Jr., Robert B., "Home Reception via Satellite," Radio Electronics.
Cooper Jr., Robert B., "Low Cost Backyard Satellite TV Earth Station," Build This.
Cooper, "How to Build a Satellite TV Receiver," Radio Electronics (1981).
Dinsel, "Die Verteilung von Fernseh-Satelliten-Signalen in Kabelnetzen," Fernseh-Und Kino-Technik, vol. 39, No. 1, Berlin, Germany, (Jan. 1985).
Douville, "A 12-GHZ Low-Cost Earth Terminal for Direct TV Reception from Broadcast Satellites", IEEE Proceedings on Consumer Electronics (1977).
Draty, David, "SDTV" A Cost-Effective Solution for MDUs, The Transponder (May 1997).
Foxcom Advertisement, "Connect . . . with Fiber"(1997).
Foxcom, "About Us," 2 pages (.COPYRGT.1997-1999).
Global Communications, Inc. ".Announcing, DBS Digi-SMATV™ Clearly the Best Value in Mini-Cable Systems" (1996).
Global Communications, Inc. "News.Flash, DBS Digi-SMATV™ Clearly the Best Value in Mini-Cable Systems" (1996).
Global Communications, Inc. Apr. 19, 1995 letter to Eddy Hartenstein.
Grant, "Direct Broadcast from Lower Power Satellites," 81 Proceedings of the IEEE International Conf. on Comm., pp. 26.1.1-16.1.5, (Jun. 1981).
Heifner Communications Oct. 18, 1996 fax to Global Communications.
Heifner Communications, Inc. "Proposal to Incorporate Traditional and L-Band Distribution" (Aug. 11, 1996).
Heifner Communications, Inc., "Private Cable Industry Gets Fiber Optic Solution to DBS Delivery!" (Mar. 13, 1997).
Hogan, Monica, "If you Can't Beat 'em, Join 'em," Satellite Retailer (May 1995).
International Cable, SkyPix, "Changing the way you watch television . . . forever.", Specifications, SkyPix 36 Antenna, Lockwood, L.W., "DirecTv—A digital DBS" (Apr. 1993).
Jurgen, "Chasing Japan in the HDTV Race," IEEE Spectrum, No. 10, pp. 26-30 (Oct. 1989).

Konishi, et al., "Satellite Broadcasting," 89 SMPTE Journal, No. 3, pp. 162-166 (Mar. 1980), First Printed Dec. 1978.
MDU Technical Specification, Multi-user Systems Specifications, Revision 1.0, DirectTV (Jan. 20, 1997).
Moore, Ivan, "Competition, You are the Gatekeeper and Planning Is The Key" (Nov./Dec. 1995).
Moore, Ivan, "Digital Dwellings," Private Cable & Wireless Cable, vol. 16, No. 10 (Oct. 1997).
Multi-user Systems Specifications, DSS-MDU Single 1000 Open Specification, Rev. 1.0, Preliminary (Jan. 17, 1997).
Mussino, "Reception and Distribution Techniques for DBS Signals in Community Antenna Installations," Alta Frequenza, vol. 55, No. 2, Milano Italy (Apr. 1986).
Mussino, Franco, Verified translation of "The Reception of Direct Broadcast Satellite TV Signals in the 12 GHz Band, Using the 'C-Mac Packet System'," Electronics and Telecommunications No. 3 (1984).
Press Release, Heifner Communications Inc. (Oct. 15, 1996).
Private Cable & Wireless Cable, "DBS and PCOs: An Evolving Relationship" (Aug. 1996).
Private Cable & Wireless Cable, vol. 16, No. 9, 3 pages (Sep. 1997).
Private Cable Investor, No. 179 (Apr. 30, 1995).
Product Review, Satellite Retailer/(Aug. 1992).
RCN Oct. 4, 1996 letter (with attachment).
Retailer News, Supplement to Triple D Publishing, Inc. Publications Issue 19 (May 6-12, 1996).
Shrader, Robert L., Electronic Communication, Fifth Edition, p. 398.
Slater, Heidi, K., "Satellite Showcase, SBCA's Vegas '97 searches to overcome the industry's critical challenges," Private Cable & Wireless Cable, p. 31 (May 1997).
Tannas Jr., "HDTV Displays in Japan: Projection-CRT Systems on Top," IEEE Spectrum, 0018-9235/89/1000-0031, pp. 31-33 (Oct. 1989).
U.S. Appl. No. 60/068,589, filed Dec. 23, 1997.
USSB Research Findings, Source: Frank N. Magid Associates, "Households with DSS Connected to Stereo Or Surround Sound System, VCR Ownership" (May 1, 1996).
White Papers, "SDTV Satellite Distribution Television System for Multiple Dwelling Units," www.foxcom.com, 6 pages (Copyright 1997-1999).
WSNet Annual Shareholder Report For the Fiscal Year Ended Aug. 31, 1997.
Martin, Ernesto R., "DBS systems, Perspectives from a profit seeking company" Telecommunications Policy, pp. 291-300 (Dec. 1985).
Hsiung, James C., "C-band DBS, An analysis of the US scrambling issue," Telecommunications Policy, pp. 77-86 (Mar. 1988).
K. Jungk, "Wellencocktail in der Hausanlage," Funkschau, Aug. 24, 1990 (with translation).
L. Ulsamer, "Eine Schussel fur viele Familien," Funkschau, Aug. 23, 1991 (with translation).
Tri T. Ha, "Digital Satellite Communications," Second Edition, pp. 25-28, 1990.
Microelectronics Technology Inc., "All Solutions for SAT-TV/SMATV/VSAT," 1 page (Jul. 1993).
Microelectronics Technology Inc., "GP5/GP51/ GP52, Telecom LNBF Series," 2 pages (Aug. 1993).
Microelectronics Technology Inc., "GP6/GP62/GP62VH/GP31ABC, Astra LNBF Series," (Aug. 1993).
Global Communications (UK) Ltd. CCOM marketing material, published on or before Oct. 19, 1993.
USPTO File History of Reexamination Control No. 95/000,293.

* cited by examiner

Figure 1

SATELLITE BROADCAST RECEIVING AND DISTRIBUTION SYSTEM

CROSS-REFERENCES TO RELATED APPLICATIONS

This continuation application claims priority under 35 USC Section 120 from each of the following prior applications:

application Ser. No. 10/016,119, filed Dec. 17, 2001, now U.S. Pat. No. 6,917,783;

application Ser. No. 09/621,464, filed Jul. 21, 2000 now U.S. Pat. No. 6,334,045;

application Ser. No. 09/001,484, filed Dec. 31, 1997 now U.S. Pat. No. 6,122,482;

application Ser. No. 08/838,677, filed Apr. 9, 1997, now U.S. Pat. No. 5,805,975;

application Ser. No. 08/394,234, filed Feb. 22, 1995, now abandoned.

FIELD

The technology herein relates generally to a satellite broadcasting receiving and distribution system and more particularly to a broadcasting receiving and distribution system that will allow for the transmission of vertical and horizontal or left-hand circular and right-hand circular polarization signals to be transmitted simultaneously via a single coaxial cable.

BACKGROUND AND SUMMARY

Satellite broadcasting has become very popular throughout the United States. Conventionally, broadcast signals are transmitted through an artificial satellite at very high frequencies. These frequencies are generally amplified and are processed by a satellite receiving arrangement after being received by an antenna or antennas and prior to application to a conventional home television set or the like.

The satellite receiving arrangement is generally composed of an outdoor unit generally associated with the antenna and an indoor unit generally associated with the television set or the like. The outdoor and indoor units are coupled via a coaxial cable.

As an example, U.S. Pat. No. 5,301,352, issued to Nakagawa et al. discloses a satellite broadcast receiving system. The system of Nakagawa et al. includes a plurality of antennas which, respectively, include a plurality of output terminals. A change-over divider is connected to the plurality of antennas and has a plurality of output terminals. A plurality of receivers are attached to the change-over divider for selecting one of the antenna. Though this system does achieve one of its objects by providing for a simplified satellite system, it does, however, suffer a major short coming. This system is silent as to any means of simultaneously transmitting vertical and horizontal polarized signals via a single coaxial cable.

U.S. Pat. No. 5,206,954, issued to Inoue et al. disclose yet another satellite system that includes an outdoor unit that is connected to a channel selector. In this exemplary implementation, the satellite signal receiving apparatus receives vertically and horizontally polarized radiation signals at the site of a receiving antenna. The signals are then transmitted, selectively to provide for either one of the vertically or horizontally polarized signals to be transmitted. This design and configuration provides for one coaxial cable to be utilized, but does not provide for the vertical and horizontal signals to be transmitted simultaneously, but rather, selectively.

None of these previous efforts, however, provide the benefits intended with the exemplary illustrative non-limiting implementation. Additionally, prior techniques do not suggest the present inventive combination of component elements as disclosed and claimed herein. The exemplary illustrative non-limiting implementation achieves its intended purposes, objectives and advantages over the prior art device through a new, useful and unobvious combination of component elements, which is simple to use, with the utilization of a minimum number of functioning parts, at a reasonable cost to manufacture, assemble, test and by employing only readily available material.

The technology herein provides a satellite broadcast receiving and distribution system that will permit the transmission of vertical and horizontal (or left-hand circular and right-hand circular) polarization signals simultaneously via a single coaxial cable. The system will accommodate two different polarity commands from two or more different sources at the same time. This exemplary illustrative non-limiting satellite broadcast receiving and distribution system will provide for the signals received from the satellite to be converted to frequencies which the line amplifiers can transport. This will permit the signals to travel via existing wiring in buildings, high-rises, hospitals, and the like so that satellite broadcasting can be viewed by numerous individuals by way of a single satellite antenna.

The exemplary illustrative non-limiting satellite broadcast system consists of a satellite antenna which receives the polarized signals. These polarized signals are transmitted to a head-in processor and are converted to different frequencies in order to render the different signals to be transmitted simultaneously. Hence, the head-in processor will permit for the transmission of signals of two different frequencies and polarities to be transmitted simultaneously and will also accommodate two different polarity commands from two or more different television receivers at the same time via a single cable. This cable is coupled to a head-out processor. These signals, once in the head-out processor, will be converted to frequencies that are required for the source (i.e. television). Once converted, the signals are transmitted to a satellite receiver. This satellite receiver is coupled to the source.

Accordingly, it is the object of the exemplary illustrative non-limiting implementation to provide a satellite broadcast receiving and distribution system that will convert different frequencies and different polarized signals in order to permit the signals to be transmitted via a single cable.

It is another object of the exemplary illustrative non-limiting implementation to provide a satellite broadcast receiving and distribution system that will provide service to mid/high-rise office buildings, condominiums, schools, hospitals and the like via a single cable.

A further object of the technology herein is to provide a satellite broadcast receiving and distribution system in accordance with the preceding objects and which will conform to conventional forms of manufacture, be of simple construction and easy to use so as to provide a system that would be economically feasible, long lasting and relatively trouble free in operation.

The present exemplary illustrative non-limiting implementation meets the requirements of the simplified design, compact size, low initial cost, low operating cost, ease of installation and maintainability, and minimal amount of training for successful use.

An exemplary illustrative non-limiting implementation provides a satellite broadcasting system An example illustrative non-limiting implementation provides a satellite broadcasting system comprising a satellite dish coupled to a low-noise block converter. The low-noise block converter is coupled to a first means of converting vertical polarization signals and horizontal polarization signals (or left-hand circular polarization signals and right-hand circular polarization signals) from a satellite, and transmitting both polarity signals simultaneously via a single coaxial cable. This enables two different frequencies and polarities to be transmitted simultaneously via a single coaxial cable.

The exemplary illustrative non-limiting implementation further includes a second means coupled to the first means. The second means converts the vertical polarization signals and the horizontal polarization signals (or said left-hand circular polarization signals and the right-hand circular polarization signals) from the first means to frequencies for a source. A satellite receiver is coupled to the second means. The source is coupled to the satellite receiver.

The exemplary illustrative non-limiting implementation further includes a power source coupled to the first means. The power source powers the first means.

In accordance with a further aspect of the exemplary illustrative non-limiting implementation, the second means provides for the signals to be converted separately and independently to the satellite receiver by a transmitting means. The present non-limiting implementation in one of its aspects further provides a transmitting means for the signals to be selectively converted to the satellite receiver via a first cable coupled to the second means.

In accordance with a further aspect of the exemplary illustrative non-limiting implementation, the transmitting means further includes a polarity switch for permitting the signals to be selectively converted to the satellite receiver.

In accordance with a still further aspect of the exemplary illustrative non-limiting implementation, the first means includes a first converting system for converting the signals of a first direction to a desired first frequency and polarization, and a second converting system for converting the signals of a second direction to a desired second frequency and polarization. The first converting system may include a first down converter which is coupled to an amplifier. The second converting system may include an up converter coupled to a second down converter. A joining means may be coupled to the amplifier and the second down converter. The joining means may include a four way splitter. A phase locked loop transmitter may be coupled to the four way splitter.

In accordance with a further aspect of the exemplary illustrative non-limiting implementation, the second means includes a splitting means to split and divide the signals from the single coaxial cable to enable the signals to be transmitted to a first converting system and a second converting system. The first converting system may convert the signals of a first direction to a desired first frequency and polarization for the satellite receiver. The second converting system may convert the signals of a second direction to a desired second frequency and polarization for the satellite receiver. The first converting system may include a first up converter which is coupled to a splitting means and a first down converter which is coupled to a first down converter. The first down converter may be coupled to the satellite receiver via a first line. The second converting system may include a second up converter coupled to the splitting means. The second up converter may be coupled to the satellite receiver via a second line. The splitting means may include a four way splitter. A phase lock loop may be coupled to the four way splitter.

In accordance with a further aspect of the exemplary illustrative non-limiting implementation, a first converting system includes a first up converter which is coupled to a splitting means and to a first down converter. The first down converter may be coupled to a joining means. The second converting system may include a second up converter coupled to the splitting means and to the joining means. A polarity switch may be coupled to the first down converter and the second up converter. The polarity switch may be coupled to a first cable which is coupled to the satellite receiver.

In accordance with a further aspect of the exemplary illustrative non-limiting implementation, the splitting means and the joining means each include a four way splitter, and a phase lock loop receiver is coupled to the spitting means. The splitting means may split and divide signals from the single coaxial cable to enable said signal to be transmitted to a third converting system for converting the signals of said first direction and a fourth converting system for converting the signals of the second direction.

The third converting system includes a second up converter which is coupled to the splitting means and to a third down converter. The third down converter may be coupled to the satellite receiver via a first conduit. The fourth converting system may include a third up converter coupled to the splitting means. The third up converter is also coupled to the satellite receiver via a second conduit.

The foregoing has outlined some of the more pertinent objects of the exemplary illustrative non-limiting implementation. These objects should be construed to be merely illustrative of some of the more prominent features and applications. Many other beneficial results can be obtained by applying the disclosed exemplary illustrative non-limiting implementations in a different manner or modifying the non-limiting illustrative implementations within the scope of the disclosure.

BRIEF DESCRIPTION OF THE DRAWINGS

These and other features and advantages will be better and more completely understood by referring to the following detailed description of exemplary non-limiting illustrative implementations in conjunction with the drawings of which.

Similar reference numerals refer to similar parts throughout the several views of the drawings.

DETAILED DESCRIPTION

Figure 1:
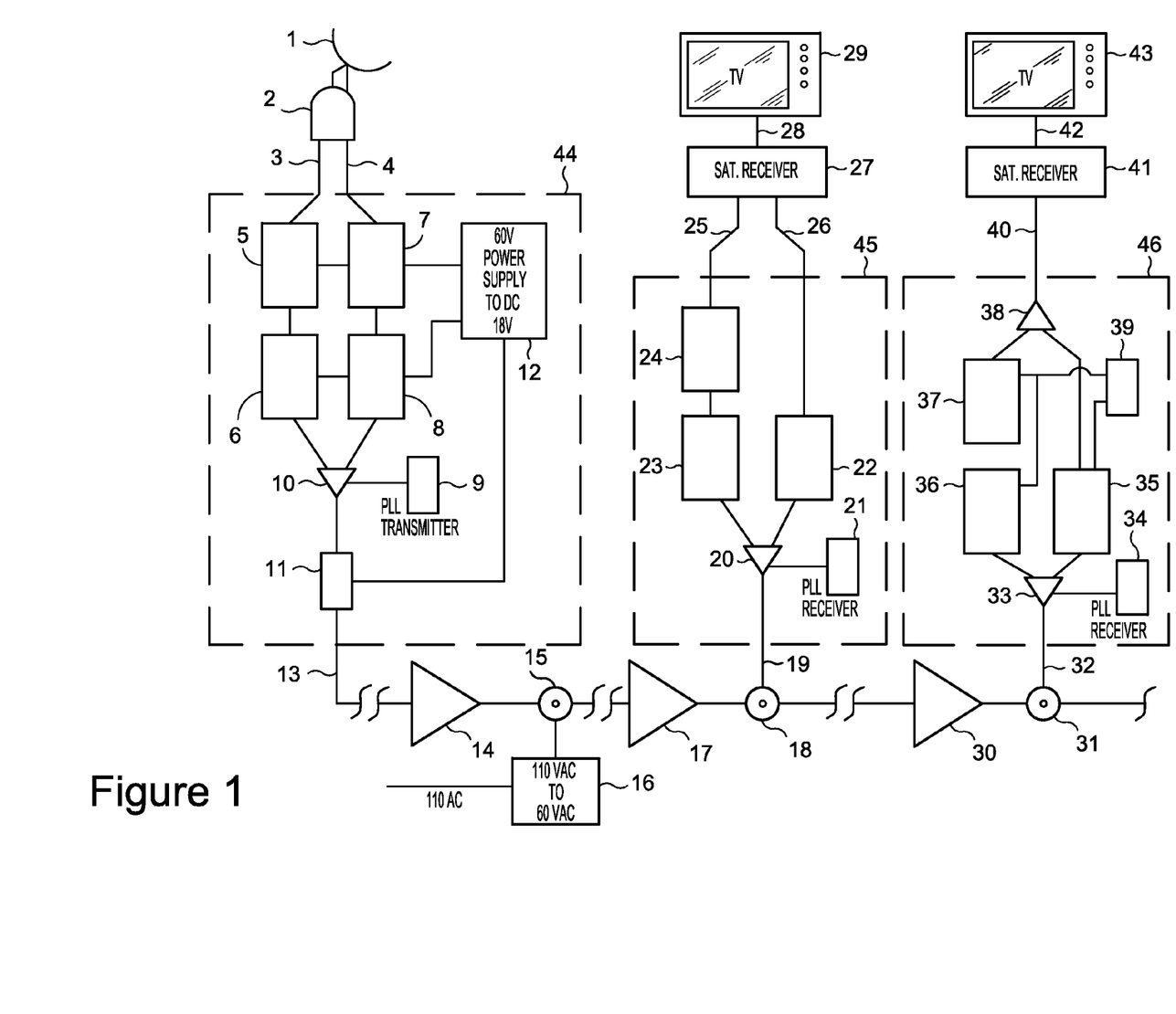
FIG. 1 illustrates a block diagram representing the satellite broadcast signal receiving and distribution system according to a preferred non-limiting exemplary implementation.

As illustrated in FIG. 1, the satellite system of an exemplary illustrative non-limiting implementation includes a receiving satellite that is connected to a head-in equipment frequency processor 44. It is at this head-in equipment frequency processor 44 where the signals (Vertical-polarized signals and Horizontal-polarized signals; or left-hand circular and right-hand circular polarization signals) are received simultaneously and then transmitted via a single coaxial cable 13 to the head-out receiver processor 45 or 46. From the receiver processor 45 or 46, the signals are transported to a satellite receiver 27 or 41 and to a source 29 or 43 (this figure illustrates a television as its source).

As illustrated, the receiving satellite antenna 1 is connected to a low-noise block converter (LNB) 2 for amplifying and converting the respective polarized signals (Vertical-polarized signals and Horizontal-polarized signals or left-hand circular and right-hand circular polarization signals). This LNB converter 2 is coupled to the head-in equipment frequency processor 44. Accordingly, after signals are received, they pass the low-noise block converter 2, to provide for the signals to enter the head-in equipment frequency processor 44 (illustrated in dashed lines) via lines 3 and 4.

The head-in equipment frequency processor 44 provides for the signals via lines 3 and 4 to be converted to the frequencies which the line amplifiers can transport via converters 5 and 7, respectively. From the lines 3 and 4, the signals or transponders are transmitted to a first converter or down converter 5 and a second converter or up converter 7, respectively. These frequency converters convert the entered frequencies to frequencies which the line amplifiers can transport.

The utilization of two converters permits for the acceptance of two signals or polarized transponders that are of a different frequency.

In the down converter 5, the transponders are converted down to a specified frequency. This specified frequency is the frequency that is required for the line amplifiers to transport. The newly converted frequencies are amplified through the amplifying means 6. At means 6, the converted frequencies are amplified so as not to create second harmonics. These signals are then transferred to a four way splitter 10.

In the up converter 7, the transponders are converted up to a specified frequency. The converted frequencies then are converted down via down converter 8. This process of converting up and then down provides for frequencies to be converted without difficulties and avoiding the forbidden conversion area.

The converted signals are transferred to the four way splitter 10 in order to combine the frequency output of the amplified signal of amplifier 6 from converter 8. To synchronize the system, the frequencies from the phase lock loop (PLL) 9 are transmitted to the splitter 10.

From splitter 10, the signals are passed through an A.C. power separator 11. Block 12 routes 60 Volts power to a D.C. power supply of 18 Volts.

This will permit for the dual polarization frequency blocks from the satellite dish 1 to be transmitted simultaneously via a single coaxial cable 13. Dependent upon the length of the cable, an optional amplifier 14 can be coupled thereto. Power from a power source 16 is inserted into the lines via a power inserter 15. The signals are amplified, as needed, with an additional amplifie(s) 17. It is noted that the amplifiers are optional and are dependent to the distance that the head-in frequency processor 44 is located from the head-out receiver processor 45 or 46. The power supply and power source 12 energizes the head-in frequency processor 44.

From the single coaxial cable 13, the signals are adjusted via a tap 18 or 31 to permit for the appropriate power level (decibels) that is required for the head-out receiver processor 45 or 46.

The head-out frequency processor 45 can take the form of a plurality of arrangements. The design and configuration of the head-out frequency processor 45 is dependent on the source (e.g., TV 29) in combination with the satellite receiver 27.

The first exemplary implementation for the head-out receiver processor is illustrated in FIG. 1 and is represented by way of dashed lines 45. As seen in this head-out receiver processor 45, the simultaneously transmitted signals enter the processor 45 via line 19. The line 19 is coupled to a four (4) way splitter 20. A phase locked loop (PLL) receiver 21 is coupled to the splitter 20 to permit for the signals to be locked to the proper and desired frequencies. From the splitter, the first frequency is transmitted to a first converter 22 in order to permit signals or transponders to be converted up to a specified frequency. This up converted signal is then transmitted to the satellite receiver 27 by way of a line 26.

The second frequencies are transmitted to a first or up converter 23 and then is transmitted to a second or down converter 24. This will permit for the signals to be converted to the desired frequency. The conversion of the signals from up to down provides the benefit of converting the frequencies without any mishap or error. This method of conversion will avoid the forbidden conversion area. This second or down converter 24 is coupled to the satellite receiver 27 via line 25. The signals received from the satellite 1 can then be transmitted to the TV (source) 29 by line 28.

As illustrated, this head-out receiver processor 45 is the reverse process of the head-in processor 44. This is to provide for the signals to reconvert to their original frequencies so as to provide for the satellite receiver and TV (source) to accept the signals. The single cable 13 accepts the signals at frequencies different than that of the TV (source) 29 and satellite receiver 27. Accordingly the head-out receiver processor 45 must reconvert the signals to the frequencies that are utilized by the source. This design and configuration of the head-out receiver processor is dependent on the design and configuration of the satellite receiver 27.

An alteration of the satellite receiver 27 requires an alteration in the head-out receiver processor. This alteration is illustrated in FIG. 1 and is shown in outline and designated as reference 46. In this design and configuration, the satellite receiver 41 utilizes only one wire 40 and accepts only one type of signals at a time, such as left-hand circular polarized signals or right-hand circular polarized signals.

As seen, the frequencies are tapped via 31. The tap 31 is coupled to the head-out receiver processor 46 via line 32 which is connected to a four (4) way splitter 33. To provide for the signals to be locked in proper frequencies, the four way splitter 33 is coupled to a phase locked loop (PLL) receiver 34.

From the splitter 33, the first signal is transmitted to a first or up converter 36, and then is transmitted to a second or down converter 37. The conversion of the signals from up to down provides the benefit of converting the frequencies without any mishap or error. This method of conversion will avoid the forbidden conversion area.

The signals from the splitter 33 are transmitted to an up converter 35 which will inherently convert the signals.

A polarity switch 39 is connected to converters 35, 36, 37 in order to permit for the head-out receiver processor to be coupled to the satellite receiver 41 via a single cable 40 and a joining means 38 which is a four (4) way splitter. The satellite receiver 41 is connected by way of line 42 to a TV (source) 43.

It is noted that FIG. 1 illustrates the use of two head-out receiver processors, but in actuality, only one head-out receiver processor is utilized with the head-in processor 44. The type and arrangement for the head-out receiver processor is dependent on the combination of the satellite receiver and TV (source) that are utilized.

The satellite system of the exemplary illustrative non-limiting implementation will permit two signals of different frequency and derived from different polarities to travel simultaneously via a single coaxial cable. The use of this satellite system will provide for a satellite system that is versatile, economical, and compact. The usage of the single cable permits for a system that can accept satellite broadcasting in places that were previously rendered impossible. These places includes mid/high-rise office buildings, condominiums, hospitals, schools, etc. The unique design and configuration enables the signals to be transmitted via the existing wiring of the buildings. The only renovations that may need to be done is the upgrading of the existing amplifiers.

While the invention has been particularly shown and described with reference to an implementation thereof, it will be understood by those skilled in the art that various changes in form and detail may be made without departing from the scope of the invention.

We claim:

1. A satellite broadcast signal converting system for use with a satellite antenna that receives at least one block of vertically polarized broadcasting signals and at least one block of horizontally polarized broadcasting signals from at least one satellite in orbit around the earth, said system comprising:
    a satellite antenna;
    a block converting circuit coupled to the satellite antenna, the block converting circuit frequency-converting said received block of vertically polarized broadcasting signals and said received block of horizontally polarized broadcasting signals to substantially non-interfering frequency signal blocks:
    a further converter coupled to said block converting circuit, said further converter further converting at least one of said received blocks of a given polarization, said further converter comprising an up-converter to up-convert said received signals of said given polarization and a down-converter to down-convert said received signals of said given polarization;
    a switch for permitting said signals to be selectively converted to a satellite receiver; and
    a low noise amplifier circuit coupled to said further converter, said amplifier circuit amplifying frequency-converted, substantially non-interfering signal blocks and applying said amplified signal blocks onto a common transmission path, thereby enabling said substantially non-interfering signal blocks to be conveyed to said satellite receiver via said common transmission path.

2. A satellite broadcasting system as in claim 1 wherein said common transmission path comprises a coaxial cable.

3. A satellite broadcasting system as in claim 1 wherein said switch selects between said blocks to be selectively converted.

4. A satellite broadcasting system as in claim 1 wherein said block converting circuit includes a first converting means for converting vertically polarized signals to a desired first frequency block and a second converting means for converting said horizontally polarized signals to a desired second frequency block different from said first frequency block.

5. A satellite broadcasting system as in claim 4 wherein said first converting means includes a first down converter and said second converting means includes an up converter coupled to a second down converter.

6. A method for conveying satellite broadcast signals from a satellite antenna that receives a block of vertically polarized broadcasting signals and a block of horizontally polarized broadcasting signals from a satellite in orbit around the earth, said method comprising:
    frequency-down-converting said received block of vertically polarized broadcasting signals, and frequency-down-converting and then frequency-up-converting said received block of horizontally polarized broadcasting signals to substantially non-interfering frequency blocks;
    amplifying said frequency-converted, substantially non-interfering signal blocks:
    applying said amplified signal blocks onto a common transmission path, thereby enabling said substantially non-interfering signal blocks to be conveyed via said common transmission path; and
    operating a switch to permit signals to be selectively converted to a satellite receiver.

7. The method of claim 6 wherein said path comprises a wire.

8. The method of claim 6 wherein said path comprises a single wire.

9. The method of claim 6 wherein said path comprises a single cable.

10. The method of claim 6 wherein said path comprises a common coaxial cable.

11. The method of claim 6 wherein said received block of vertically polarized broadcasting signals and said received block of horizontally polarized broadcasting signals come from different transponders.

12. The method of claim 6 wherein said frequency-up-converting comprises mixing received signals with a phase locked loop oscillator output.

13. The method of claim 6 further including further converting a selected one of said received block of vertically polarized broadcasting signals and said received block of horizontally polarized broadcasting signals for application to satellite receiving equipment.

14. The method of claim 6 wherein said at least some of said signals comprise television signals.

15. A satellite broadcasting system comprising:
    a satellite dish;
    a low-noise block converter coupled to said satellite dish, said low-noise block converter coupled to a further converting arrangement;
    said further converter arrangement converting vertical polarization signals and horizontal polarization signals or left-hand circular polarization signals and right-hand circular polarization signals received from a satellite and transmitting said further converted signals simultaneously via the same coaxial cable for enabling two different polarizations to be transmitted simultaneously via said same cable,
    wherein said further converter arrangement includes a first converting system that converts received satellite signals of a first direction to a desired first frequency and a second converting system that converts said signals of a second direction to a desired second frequency,
    said system further including a switch for permitting said signals to be selectively converted to a satellite receiver,
    wherein said first converting system comprises a down converter and said second converting system comprises an up converter.

16. A satellite broadcasting system comprising:
    a satellite dish;
    a low-noise block converter coupled to said satellite dish, said low-noise block converter coupled to a further converting arrangement;
    said further converter arrangement converting vertical polarization signals and horizontal polarization signals or left-hand circular polarization signals and right-hand circular polarization signals received from a satellite and transmitting said further converted signals simultaneously via the same coaxial cable for enabling two different polarizations to be transmitted simultaneously via said same cable,
    wherein said further converter arrangement includes a first converting system that converts received satellite signals of a first direction to a desired first frequency and a second converting system that converts said signals of a second direction to a desired second frequency,
    said system further including a switch for permitting said signals to be selectively converted to a satellite receiver, wherein said second converting system comprises a circuit that up-converts and down-converts.

17. A satellite broadcasting system comprising:
a satellite dish;
a low-noise block converter coupled to said satellite dish, said low-noise block converter coupled to a further converting arrangement;
said further converter arrangement converting vertical polarization signals and horizontal polarization signals or left-hand circular polarization signals and right-hand circular polarization signals received from a satellite and transmitting said further converted signals simultaneously via the same coaxial cable for enabling two different polarizations to be transmitted simultaneously via said same cable,
wherein said further converter arrangement includes a first converting system that converts received satellite signals of a first direction to a desired first frequency and a second converting system that converts said signals of a second direction to a desired second frequency,
said system further including a switch for permitting said signals to be selectively converted to a satellite receiver,
said first converting system comprises first converting means for converting said vertical polarization signals,
said further converter provides for said signals to be converted separately and independently to said satellite receiver, and
wherein said first converting system includes a first down converter which is coupled to an amplifier and said second converting system includes an up converter coupled to a second down converter and a joining means coupled to an amplifier and said second down converter.

18. A satellite broadcasting system as in claim 17 wherein said joining means includes a four way splitter.

19. A satellite broadcasting system as in claim 18 further including a phase lock loop.

20. A satellite broadcasting system as in claim 17 further including a splitting means to split and divide said signals from said coaxial to enable said signal to be transmitted to a third converting system for converting said signals of said first direction and a fourth converting system for converting said signals of said second direction.

21. A satellite broadcasting system as in claim 20 wherein said third converting system includes a second up converter which is coupled to said splitting means and said second up converter is coupled to a third down converter, said third down converter is coupled to said satellite receiver via a first conduit, said fourth converting system includes a third up converter coupled to said splitting means, and said third up converter is coupled to said satellite receiver via a second conduit.

22. A satellite broadcasting system as in claim 17 further including a splitting means to split and divide said signals from said coaxial to enable said signals to be transmitted to a third converting system for converting said signals of said first direction to a desired first frequency and polarization and a fourth converting system for converting said signals of said second direction to a desired second frequency and polarization.

23. A satellite broadcasting system as in claim 22 wherein said third converting system includes a second up converter which is coupled to said splitting means and said second up converter is coupled to a third down converter, said third down converter is coupled to a second joining means, said fourth converting system includes a third up converter coupled to said splitting means, and said third up converter is coupled to said second joining means, a switch is coupled to said third down converter and said third up converter, and said switch is further coupled to a conduit which is coupled to said satellite receiver, and said second joining means is coupled to said conduit.

24. A satellite broadcasting system comprising:
a satellite dish;
a low-noise block converter coupled to said satellite dish, said low-noise block converter coupled to a further converting arrangement;
said further converter arrangement converting vertical polarization signals and horizontal polarization signals or left-hand circular polarization signals and right-hand circular polarization signals received from a satellite and transmitting said further converted signals simultaneously via the same coaxial cable for enabling two different polarizations to be transmitted simultaneously via said same cable,
wherein said further converter arrangement includes a first converting system that converts received satellite signals of a first direction to a desired first frequency and a second converting system that converts said signals of a second direction to a desired second frequency,
said system further including a switch for permitting said signals to be selectively converted to a satellite receiver,
further including a splitting means to split and divide said signals from said single coaxial cable to enable signals of a first direction to be converted to a desired first frequency for said satellite receiver and signals of a second converting system to be converted to a desired second frequency for said satellite receiver.

25. A satellite broadcasting system as in claim 24 further including a first up converter and a second up converter coupled to said splitting means.

26. A satellite broadcasting system as in claim 25 wherein said splitting means includes a four way splitter.

27. A satellite broadcasting system as in claim 26 further including a phase lock loop coupled to said further converter.

28. A satellite broadcasting system comprising:
a satellite dish;
a low-noise block converter coupled to said satellite dish, said low-noise block converter coupled to a further converting arrangement;
said further converter arrangement converting vertical polarization signals and horizontal polarization signals or left-hand circular polarization signals and right-hand circular polarization signals received from a satellite and transmitting said further converted signals simultaneously via the same coaxial cable for enabling two different polarizations to be transmitted simultaneously via said same cable,
wherein said further converter arrangement includes a first converting system that converts received satellite signals of a first direction to a desired first frequency and a second converting system that converts said signals of a second direction to a desired second frequency,
said system further including a switch for permitting said signals to be selectively converted to a satellite receiver,
further including a splitting means to split and divide said signals from said single coaxial cable to enable converting of signals of a first direction to a desired first frequency and polarization for said satellite receiver and to enable converting of signals of a second direction to a desired second frequency and polarization for said satellite receiver.

29. A satellite broadcasting system as in claim 28 further including a first up converter which is coupled to said splitting means and said first up converter is coupled to a first down converter, said first down converter is coupled to a joining means, and a second up converter coupled to said splitting means, said second up converter being coupled to said joining means, and said switch coupled to said first down converter and said second up converter.

30. A satellite broadcasting system as in claim 29 wherein said splitting means and said joining means each include a four way splitter, and said system further includes a phase lock loop.

31. A satellite distribution method comprising:
using a satellite dish to receive signals from a satellite;
converting said received satellite signals with a low-noise block converter;
further converting received vertical polarization signals or left-hand circular polarization satellite signals;
further converting received horizontal polarization signals and right-hand circular polarization satellite signals;
transmitting said further converted signals simultaneously via the same coaxial cable, thereby enabling two different polarizations to be transmitted simultaneously to a satellite receiver via the same cable,
wherein said further converting includes converting signals of a first direction to a desired first frequency and converting signals of a second direction to a desired second frequency,
at least one of said further converting steps passing signals through a circuit having a phase locked loop, and further having an upconverter and a downconverter each operable on the same polarization signals; and
actuating a switch permitting said signals to be selectively converted to a satellite receiver.

32. A satellite broadcasting system comprising:
a satellite dish;
a low-noise block converter coupled to said satellite dish, said low-noise block converter coupled to a further converting arrangement;
said further converter arrangement converting vertical polarization signals and horizontal polarization signals or left-hand circular polarization signals and right-hand circular polarization signals received by the satellite dish and transmitting said further converted signals simultaneously via the same coaxial cable for enabling two different polarizations to be transmitted simultaneously via said same coaxial cable,
wherein said further converter arrangement includes a first converting system that converts signals of a first direction to a desired first frequency and a second converting system that converts said signals of a second direction to a desired second frequency,
said system further including a switch for permitting said signals to be selectively converted to a satellite receiver, and
said further converter comprises an up-converter and a down-converter each operable on received satellite signals of the same polarization. receiver, and said second joining means is coupled to said line.

* * * * *

UNITED STATES PATENT AND TRADEMARK OFFICE
CERTIFICATE OF CORRECTION

PATENT NO.        : 7,542,717 B2                          Page 1 of 1
APPLICATION NO.   : 11/089131
DATED             : June 2, 2009
INVENTOR(S)       : James A. Green, Sr. et al.

It is certified that error appears in the above-identified patent and that said Letters Patent is hereby corrected as shown below:

In the claims,

Column 2, lines 26-27:

Delete: "receiver, and second joining means is coupled to said line."

Signed and Sealed this
Sixteenth Day of February, 2016

Michelle K. Lee
*Director of the United States Patent and Trademark Office*